Oct. 12, 1965 E. L. GAMBER 3,211,810
PROCESS FOR MAKING A NON-ROTATING CORNEAL LENS
Filed Nov. 27, 1961

INVENTOR.
ELMER L. GAMBER
BY Barnes & Seed
ATTORNEYS

3,211,810
PROCESS FOR MAKING A NON-ROTATING CORNEAL LENS
Elmer L. Gamber, 1420 N. 40th, Seattle, Wash.
Filed Nov. 27, 1961, Ser. No. 154,992
2 Claims. (Cl. 264—1)

The present invention relates to improvements in the manufacture of corrective ophthalmic lenses of the contact corneal type, and namely, a lens having a margin smaller than the maximum opening of the iris.

More particularly the invention aims to provide a more reliable, simple and economical method for producing a corneal lens of the general type shown in my earlier Patent No. 3,102,157, issued Aug. 27, 1963.

Other more particular objects and advantages will, together with these general objects, appear and be understood in the course of the following description and claims, the invention consisting in the novel construction and in the adaptation and combination of parts hereinafter described and claimed.

Figure 1:
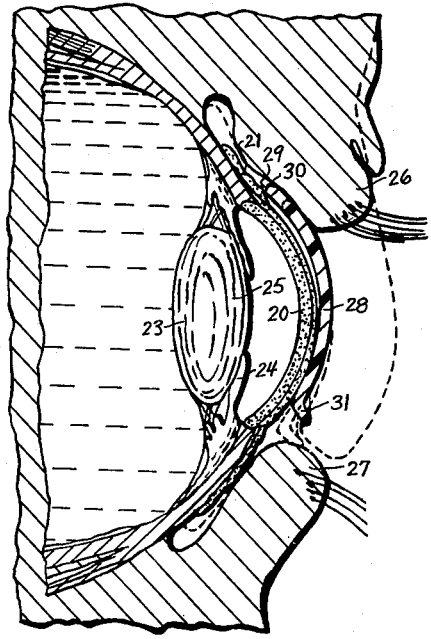
FIGURE 1 is a semi-schematic vertical section through the forward portion of a human eye illustrating in full lines a contact lens made by the present invention in applied position thereon, but having shifted upwardly partially beyond the limbus, and illustrating in broken lines the upper eye lid in blinking position and the contact lens responsively repositioned.
Figure 2:
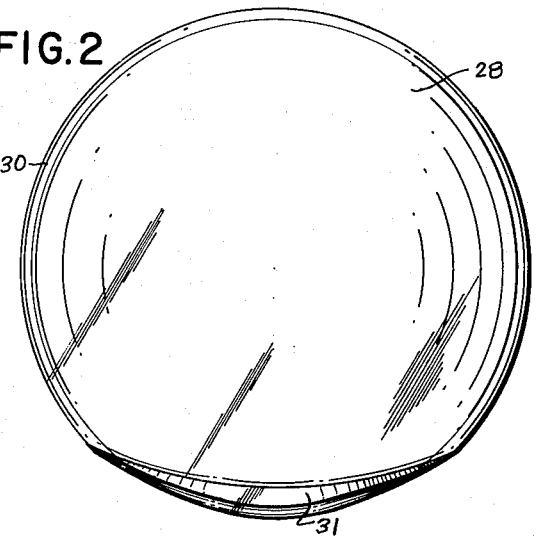
FIG. 2 is an enlarged front elevational view of the corneal lens.
Figure 3:
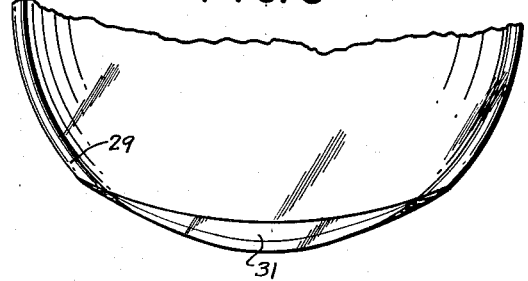
FIG. 3 is a fragmentary rear elevational view of the lens.

Referring to the drawings it is seen that an eye is illustrated in which the cornea and sclera are generally indicated at 20–21, respectively, with the limbus portion at the juncture thereof being denoted 22. The lens of the eye is shown at 23 over which the iris 24 functions by its opening to define the pupil 25. Numerals 26 and 27 have been applied to the upper and lower eyelids, respectively.

The contact lens made by the present invention has a concavo-convex body 28 of any suitable transparent thermoplastic material such, for example, as methyl methacrylate. Usually the material will be perfectly transparent, but in some instances it may be slightly darkened or tinted for glare reducing purposes or to enhance or modify the natural color of the iris to the end of obtaining desired cosmetic effects.

The lens body 28 will perforce vary in size and shape to conform to the particular eye to which it is fitted. In any case it will be larger than the pupil size corresponding to the maximum opening of the iris, and will normally be of a size within the limbus of the eye. As common in the art, the concave side of the lens is shaped relative to the eye such that the natural eye fluids can flow between the lens and the cornea to provide an intermediate tear layer. It is the capillary attraction of this tear film which holds the lens in place. The rim portion of the lens at its concave side is beveled as at 29 to facilitate the passage of the lens body over the protruding limbus should the lens be temporarily displaced, and this bevel also provides an enlarged peripheral opening for free circulation of the eye fluids to and from the corneal area. The marginal portion of the convex surface of the lens body is preferably also beveled as indicated at 30 to facilitate the passing of the conjunctiva of the eyelids thereover. Both bevels 29 and 30 should be relatively small and confined to the portion of the lens radially beyond the maximum opening of the iris so that the user need never look through a beveled portion.

Figure 4:
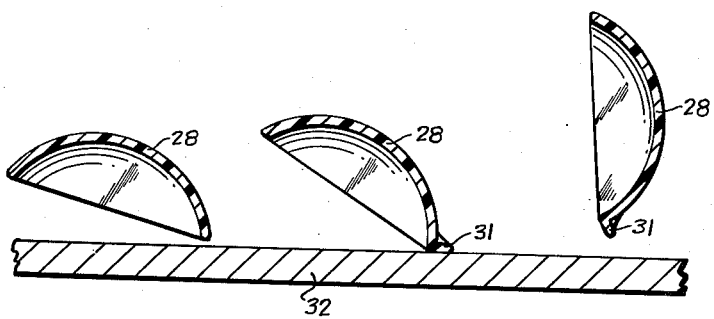
FIG. 4 is a schematic view illustrating the process for applying the stop flange on the lens.

The usual procedure in making a corneal lens is to take a cylindrical blank of a suitable material, first cut and polish the concave inside face, then cut and polish the convex exterior face, and finally cut the outside diameter and bevel the margin after which the lens is buffed. In the practice of the present invention this normal procedure is followed by a forming step to provide a lower marginal flange 31 projecting forwardly, i.e., in the general direction of the convex face of the lens. This forming step is accomplished as indicated schematically in FIG. 4, from left to right, by holding the lower edge of the lens against a heated surface 32 with the back side of the lens at an acute angle therewith until such lower edge is just softened sufficiently to be formed. Then the lens is rotated forwardly about the heated portion while gentle pressure is applied thereon in the direction of the heating surface so that the lower edge portion of the lens is bent relative to the lens proper to form the flange 31. The lens is then lifted from the heating surface and upon cooling is ready for use.

The extent and angle of the flange is not critical and can be varied from that illustrated as long as it projects outwardly such as to be engageable by the eyelids of the patient. The cross-sectional shape can also be modified as for example for patients having eyes in which the lower rim of the cornea is spaced above the lower eyelid. In such cases the stop flange can be stepped outwardly to clear the limbus.

A single power lens has been illustrated for purposes of example, but as pointed out in the objects, it is to be understood that because of the prevention of lens rotation by the stop flange, the lens can have segments of varying power for bifocal or trifocal use, or may employ prisms or be decentered where such is required for vision correction. In all of these cases the stop flange would project outwardly beyond the outer lens face as determined for the correction, and be located at the lower end thereof.

The advantages of the invention, it is thought, will have been clearly understood from the foregoing detailed description of the illustrated preferred embodiment. Minor changes will suggest themselves and may be resorted to without departing from the spirit of the invention, wherefore it is my intention that no limitations be implied and that the hereto annexed claims be given a scope fully commensurate with the broadest interpretation to which the employed language admits.

What I claim is:

1. A method of producing a non-rotatable corneal contact lens of the type having a stop flange comprising providing a circular concavo-convex lens body from a transparent thermoplastic material, and then forming a lower segment of said lens body into a stop flange by applying heat and pressure to said segment while rotating the lens forwardly about the heated segment such as to bend it in the convex direction of the lens.

2. A method of producing a non-rotatable corneal contact lens of the type having a stop flange comprising providing a polished circular concavo-convex lens body from a transparent thermoplastic material, resting the lower edge of said lens body against a heated surface to heat a lower segment of the lens body to a formable temperature, applying downward endwise pressure on said lens body while rotating it forwardly about the heated segment on said surface from a position whereat the concave side of the lens body is at an acute angle with said surface to a position enlarging said angle to thereby form a stop flange from the lower segment of the lens body.

References Cited by the Examiner

UNITED STATES PATENTS

| | | | |
|---|---|---|---|
| 2,330,837 | 10/43 | Mullen | 18—56 |
| 2,369,758 | 2/45 | Sheldon | 18—47.5 |
| 2,510,438 | 6/50 | Tuohy | 88—54.5 |
| 2,653,515 | 9/53 | Stimson | 88—54.5 |
| 2,979,776 | 4/61 | Morin | 18 |
| 3,013,300 | 12/61 | Gaenzle | 18 |

ROBERT F. WHITE, *Primary Examiner.*

DAVID H. RUBIN, ALEXANDER H. BRODMERKEL,
*Examiners.*